Patented Sept. 16, 1941

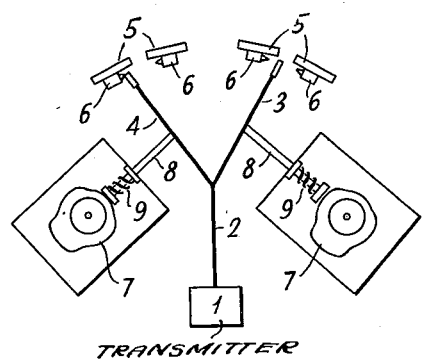
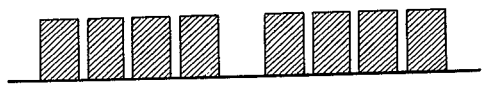
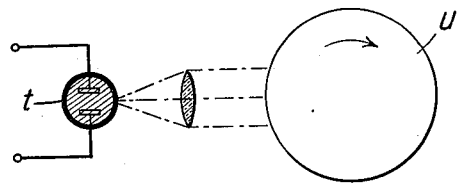
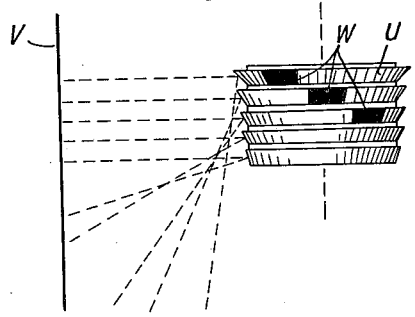
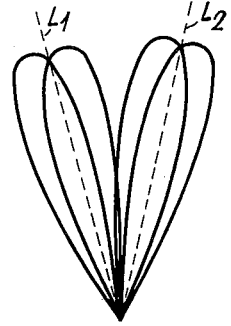
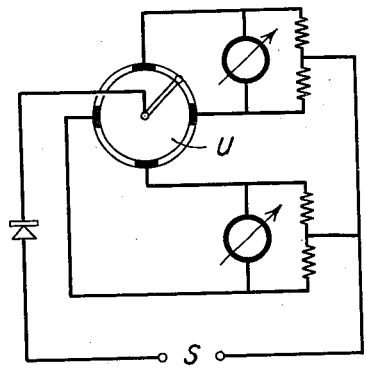
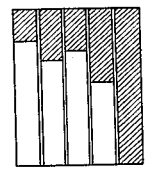
INVENTORS
WALDEMAR ILBERG
KARL ROHRICH
BY
ATTORNEY

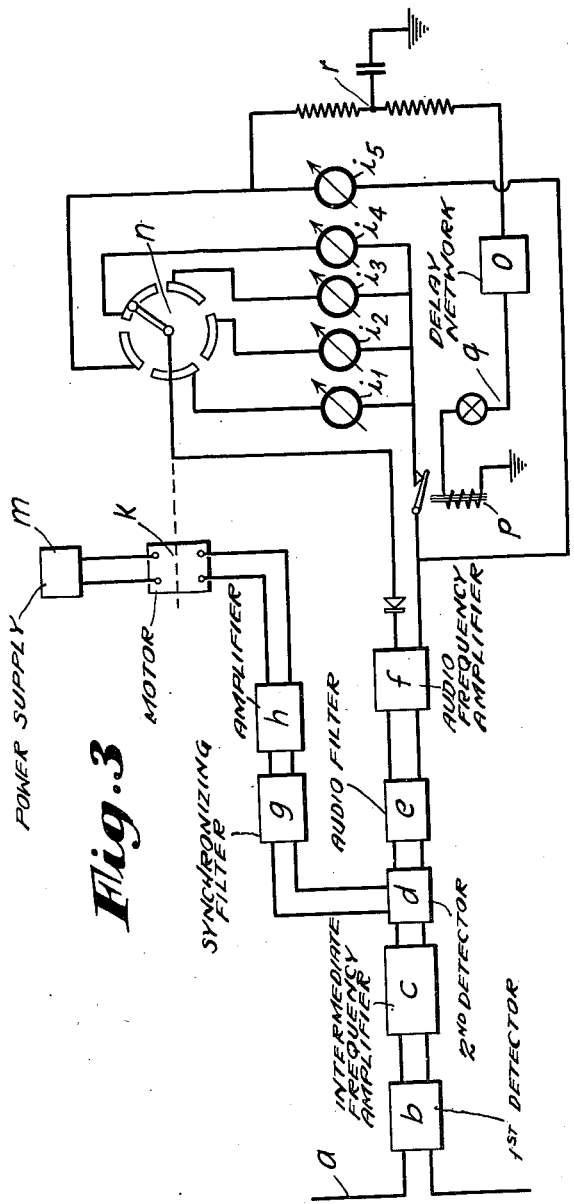

2,256,090

UNITED STATES PATENT OFFICE 2,256,090

METHOD AND MEANS FOR GUIDING AIRCRAFT

Waldemar Ilberg and Karl Röhrich, Berlin, Germany, assignors to Telefunken Gesellschaft für Drahtlose Telegraphie m. b. H., Berlin, Germany, a corporation of Germany Application December 24, 1937, Serial No. 181,520
In Germany December 24, 1936

13 Claims. (Cl. 250—11)

The disadvantages are well known which are found in the hitherto proposed methods of producing a guide ray by several modulation notes. They lie primarily in the fact that the guide ray does not consist of an amplitude comparison of the receiving field strengths but in a comparison of the volumes of several modulation notes obtained from one or two transmitters. The guide ray thus does not exist absolutely but among other conditions is subject to the effect of the frequency pattern of the amplifier which in turn is as regards high frequency not entirely independent of the combination of the tubes. Furthermore, the various damping actions of the selective circuits and the degree of coupling of the detectors or heat measuring apparatus at said circuits produce an effect. Finally, when using detectors, the indication of the guide ray depends on the characteristic of said detectors which may eventually differ or vary with the time. These factors cause a certain uncontrollable condition in the indication. They are particularly disagreeable where a larger number of receiving stations is to be given exactly the same properties. In the hitherto used method it will be difficult to adjust two receiving stations to the same marking of the guide ray. A further drawback in the arrangement of a system for designating travel lanes by wireless is the large number of modulation frequencies necessary for this older method.

The difficulties and disadvantages of the aforementioned method suggest to build up again the guide ray in accordance with the principle of comparing the field intensities such as was previously done in the $a$—$n$ method. The difference between the present method resides, however, in that now two separate guide rays are to be produced from a single transmitter and which form a certain small angle with each other. In fact, the marking of ship lanes has exactly as in the case of the optical designation, to be established by means of sectors and not through guide lines.

The sending out of certain signal combinations and the audible reception thereof must, of course, be left entirely out of consideration. This would in practice be impossible in view of the rapid switching of the transmitters necessary due to eventually occurring fading of the reception (caused by the so-called steamer effect). The method must be suited in the first place for the optical indication and observation. In this lies likewise an essential difference from the $a$—$n$ method.

At the transmitter side, the problem resides in feeding alternatively four directive radiators from a single transmitter without giving hereby simultaneously different modulation notes. Accordingly, the present invention proposes only one modulation frequency which, in order to improve the sensitivity of the receiver, will be used to modulate therewith an intermediate carrier. To distinguish between different marking sectors, each sector receives a definite modulation frequency of the audio-frequency range. Obviously, it is also possible to distinguish the individual sectors from one another by different intermediate frequencies. In this case all sectors will have the same audible modulation frequency. The switching of the transmitter to the various antennas can be done in principle in two different ways. Either only one antenna among four antennas will be connected at a time or all four antennas are connected whereby always three thereof are short circuited. The connecting or short circuiting may be carried out by capacitive means, or by inductive means, or directly. However, it has been found that the capacitive blocking of energy lines involves difficulties and is defective. Therefore, a direct separation of the energy lines is proposed. In this case always one radiator is connected to the transmitter. Obviously, where properly designed and remotely controlled decimeter wave tubes are available they can be used for switching to the antennas.

Referring now to the drawings for a more complete exposition of our invention, Fig. 1 illustrates schematically the arrangement of the transmitter; Fig. 2 illustrates the radiation characteristic pattern of the transmitter; Fig. 3 illustrates the receiver arrangement used in our invention; Fig. 4 shows the wave form of the received signal; Fig. 5 illustrates a modification of the indicating means of Fig. 3; Figs. 6, 7 and 8 illustrate a further modification of the indicating means at the receiver.

In Fig. 1 the energy line 2 coming from the transmitter 1 is branched off into two flexible switch arms 3 and 4, each of which has a length equal to ½ the length of the operating wave or a multiple thereof. With this length the arm which does not produce the switching, i. e. the arm that happens to be in a central position has a very high resistance thus not causing a disturbing effect. Each switch arm has two pairs of contacts assigned thereto and which are connected across power lines to the individual directive radiators. The contacts cooperating with each switch arm may be of the bushing or plug type in the manner found to be favorable in the older a—n switches whose construction may here serve as a step in the right direction. But also contact blocks may be utilized affording a longer life. Irrespective of the design of the contacts, it should be borne in mind in the first place that no appreciable variations in the wave resistance of the lines should exist.

Fig. 1 shows the radiators 5 with the contacts 6. They must be so arranged that according to Fig. 2 always two loop shaped radiation characteristics furnish a guide ray $L_1$ and $L_2$ respectively. The angle formed by the two guide rays then represents the desired marking sector.

The switch arms operate independently of each other and are driven by means of cam disks 7 in conjunction with pusher rods 8 and pressure springs 9. In this way one switch arm is permitted to remain in a central position while the other arm carries out the switching and vice versa. The entire switching mechanism can, as to structure, be to a great extent a reproduction of the well designed valve drive of the combustion motor. Pressure spring, pusher and cam disks move in an oil bath.

The sequence of the switching performance can obviously be as desired. There also exists the possibility of providing a switching by using only a single cam disk.

In accordance with the invention the four directive radiators may be fed for instance during $\frac{1}{25}$ of a second. During this time each radiator is connected for $\frac{1}{100}$ of a second at the most with the transmitter. But this time period must not be fully used for reasons that will be explained in detail at a later place. Hence, the switching is carried out in the rhythm of 25 cycles. This rapid switching sequence should to a high degree fulfill the requirements in regard to fading, etc. This switching arrangement can be built for absolutely reliable operation such as is known from the combustion engine in which much higher speeds of switching can be handled.

The transmitter antennas can be designed as defocussed parabolic radiators or preferably as plain surface radiators. In fact, it was found that the parabolic radiator causes considerable difficulties as regards the elimination of diagram peaks necessary for eliminating disturbing side guide rays and hitherto such difficulties could only be overcome by way of experimenting. However, in the plain surface radiator, an approximately peak-free diagram can be obtained theoretically and practically by a stepped feeding of the so-called pine tree antennas. For stepping up the amperage, the lead-ins may to advantage have small capacitances inserted therein aside from the resistors. Always two radiators are arranged in the box like fashion. This is appropriate in order that the two decimeter wave radiations forming together a guide ray have the same path length as regards the direct and reflected ray.

According to Fig. 3, the receiver arrangement comprises the antenna $a$, the detector path $b$, and a following tuned high-frequency amplifier $c$, affording a very effective amplification of the intermediate high-frequency carrier with a small number of tubes. It also is provided with automatic volume control whose time constant must, however, be greater than the switching sequence. The negative control potential and the alternating potential having audio-frequency are derived from a duo-diode. Following the detector path $d$, a filter circuit $e$ is inserted tuned to the audio-frequency modulations of the transmitter and acting on the input of a single stage or double stage audio-frequency amplifier $f$. The use of an audio-frequency amplifier is for the reason of improving the selective properties of the audio-frequency filter circuit.

The proposition in accordance with the invention resides in that with the switching of the transmitter to four directive radiators the receiver output potential is switched in synchronism with four measuring instruments assigned to the individual radiators. The synchronism of the switching of the receiver can in principle be obtained in various ways, for instance, by means of a second transmitter which sends out the switching frequency in a rather unconcentrated state, thereby driving a synchronous motor at the receiver. In accordance with the invention the synchronizing of the switching at the place of reception is attained, while avoiding a second transmitter, by using the switching rhythm itself to provide the synchronizing. To this end, it is only necessary that in the radiated impulse sequence of the transmitter the 25 cycle note, for instance, appears. This can be achieved in that after each switching of the four directive radiators, a pause of about $\frac{1}{5}$ of the time, i. e. a pause equal to the length of an impulse is provided (Fig. 4). In this case in the signal sequence sent out, a frequency of 25 cycles is contained. This frequency is likewise filtered out at the place of reception after the duo-diode, and transmitted from the circuit $g$ to an amplifier $h$. With an output energy of about 1 watt a small D. C. motor K consuming about 50 watts and which is fed from the current source $m$ and whose normal number of revolutions is approximately 25 per second, can be synchronized with an accuracy of the angle of 10°. In view of the fact that for reasons that will be given below, no particular requirements as regards the synchronism at the receiver side need be fulfilled, the synchronizing arrangement for the switching of the guide ray can be constructed in a very simple manner.

The measuring instruments at the receiver side can be connected across collector slip rings or by means of sets of springs operated by cams. The marking of the guide ray may, as is obvious, also be indicated by means of differential instruments. In this case, in place of a bolometer or thermo-transformer, a rectifier cell having a steep slope will be of advantage. Through a special electrodynamic damping of the measuring instruments a sufficient inertia of the indication can be attained. In the example of construction according to Fig. 3, a commutator $n$ is assumed, connecting in succession the instruments $i_1$, $i_2$, $i_3$, and $i_4$.

The exactness of the angle necessary for the synchronizing at the receiver side will now be briefly investigated. If at the transmitter, the feeding of the directive radiators were to be carried out at intervals such that the individual impulses are switched without interruption, the synchronizing at the receiver side would have to be accurate to an extremely high degree. However, the method can be essentially simplified by inserting pauses of approximately 10 angle degrees in length. Then, the synchronizing at the receiver side is to take place with an accuracy of only ±10 angle degrees. Any shift in the time of the switching of the indicating apparatus remaining within this limit then extends in the same manner to all four measuring instruments, or in other words, all four instruments are then switched earlier or later by the same time. It is presumed that the motor continues to move uniformly during a single revolution such as can be readily accomplished by providing a fly wheel.

The synchronizing can in accordance with the invention also be carried out in that during the period of synchronizing the transmitter is modulated by another modulation frequency which is utilized as such at the place of reception after having been filtered accordingly, for obtaining the synchronism. In order to send out the synchronizing note a fifth directive radiator can be briefly connected to the transmitter which covers the sectors enclosed by the two guide rays. Or the two exterior guide ray antennas which likewise cover a wide angle can be connected in common. For the sake of greater simplicity, however, the method described above in which a special frequency is not required, appears to be preferable.

For this method in accordance with a further feature of the invention an indicating instrument $i_5$ is provided, affording supervision of the phase position. In this arrangement, a fifth cam, or slip ring, or lamella, is added to the four cams, or slip rings, or collector lamellae and in its normal state, i. e. in case of complete synchronism, connects the said instrument to the receiver output just at the time when the transmitter has its synchronizing interval. This switching is carried out directly following the fourth impulse and is terminated again just when the first impulse sets in again. If appropriate synchronism exists between the switching of the transmitter and receiver, the instrument will not furnish an indication since it is connected only if at the transmitter side an interval is present between the synchronizing signals. But, if the synchronism shifts somewhat in any manner, the instrument either receives some voltage from the fourth impulse, for instance, if the motor is in advance of its correct position, or from the first impulse if the motor happens to lag. The magnitude of this deviation is a measure of the lack in accuracy of the synchronization. This incomplete exactness has no detrimental effect as long as it stays within $\pm 10$ angle degrees, but when it extends beyond this value the guide ray indication is inaccurate.

Furthermore, a blocking of the indication is carried out when the value of the allowable deviation of the synchronism is exceeded. This can be done, for instance, by the voltage appearing at the fifth instrument after having been amplified, actuating a relay $p$ through delay circuit $o$ whereby all four guide ray instruments will be disconnected or short-circuited. At the same time, a luminous signal $q$ or the like can be given by which the automatic shutting down of the guide ray indication is brought to attention by optical or acoustic means. The delay circuit $o$ serves for smoothing and delaying the blocking potential.

Now, if the complete synchronism is reestablished at the receiver, the blocking of the indication will again be eliminated automatically. Moreover, the potential appearing at the fifth instrument may be utilized for improving the synchronizing action.

According to Fig. 5, in place of four indicating instruments two instruments can be provided in differential connection. In this arrangement the terminals $s$ represent the output of the audiofrequency amplifier $f$ of Fig. 3. If the systems of the two instruments are axially arranged, the pointers of both instruments indicate directly the position of the guide rays $L_1$ and $L_2$ shown in Fig. 2. In order to extend the object of the invention directed toward eliminating as far as possible the instruments at the receiver side which may influence the indication of the position of the guide ray, it is proposed to replace the indication instruments and sets of contacts thereof by a single indicating instrument. The arrangement may in this case, for instance, be such as shown in Fig. 6 wherein a single rod-type glow tube $t$ is so excited that the magnitude of luminescence depends on the voltage applied. Each directive radiator of the transmitter then produces a certain length of the luminescent path in accordance with the intensity of the receiving field. In Fig. 7, the individual luminescent columns are shown situated adjacent each other. But since the switching of the transmitter must take place at a very high speed, the eye can not follow the fluctuations of the luminous column thus being unable to estimate the position of the receiver in the guide ray sector.

An indication is, however, attained by means of a mirror wheel rotating in front of the fluorescent tube, said wheel being controlled by the transmitter in regard to synchronism and exactness of the angle. In the present case, the arrangement may, however, be essentially simplified. The mirrors of the wheel are so set that they furnish on a frosted disk $v$ (Fig. 8) or the like, five adjacent and accurately defined positions of the reflected fluorescent tube. Four luminous stripes correspond to the four assigned directive radiators of the transmitter, while the fifth luminous stripe permits of controlling the synchronism of the mirror wheel. The latter performance is such that this mirror section is always in effect when the transmitter has its interval between the synchronizing signals. In the normal state the fifth field is dark in the indication of the receiver. But, if the synchronism is somewhat disturbed, the fifth field is luminous, the luminous portion increasing with the magnitude of the deviation from synchronism of the receiver. Since each of the five fields will be 25 times illuminated during one second, the eye receives the impression of four or five uniformly illuminated fields which, however, have a different height in accordance with the position of the receiver in the guide ray sector. Obviously, in place of the mirror wheel, other deviation systems known may be used, for instance, the Nipkow disk. The type of deviation must then be adapted to these systems in a suitable manner.

Since the output potential may undergo intensive and short fluctuations owing to the steamer effect, also the height of the luminous column will follow these short fluctuations. This entails, however, a blurred indication. Therefore, it is furthermore proposed to suppress these fluctuations of the indication by a phosphorescent layer having after-glow.

In Fig. 8 a mode of construction of the mirror wheel is shown. Small mirrors $w$ are disposed within short distances at angles such that an image according to Fig. 7 appears on a screen $v$.

In place of the glow tube also a Braun tube may be used. At incomplete synchronism a blocking of the indication may in this case be obtained by means of a photo-electric cell arranged in the fifth field.

We claim:

1. The method of guiding a vehicle which comprises transmitting in a plurality of at least partially overlapping beams, spaced impulses of radiant energy in a predetermined sequence, and modulated with a single frequency, consecutive impulses being radiated in different beams, receiving said impulses on said vehicle, demodulating said impulses, and generating a separate sensible indication of the relative amplitude of the modulation on each of said impulses, said indications being continuously sensible whereby the relative position of said vehicle with respect to said beams may be determined.

2. The method of guiding a vehicle which comprises transmitting in a plurality of at least partially overlapping beams, impulses of radiant energy in a predetermined sequence, and modulated with a single frequency, said impulses being separated by short blank intervals and consecutive impulses being radiated in different beams, receiving said impulses on said vehicle, demodulating said impulses, and generating separate but simultaneously visible adjacent indications of the amplitudes of the modulation on each of said impulses whereby the relative position of said vehicle with respect to said beams may be determined.

3. The method of guiding a vehicle which comprises transmitting in a plurality of at least partially overlapping beams, spaced impulses of radiant energy in a predetermined sequence, and modulated with a single frequency, consecutive impulses being radiated in different beams, receiving said impulses on said vehicle, demodulating said impulses, and generating a continuously visible indication of the relative amplitudes of the modulation on said impulses whereby the relative position of said vehicle with respect to said beams may be determined.

4. A system of guiding vehicles by radiant energy which comprises a transmitting station having a plurality of separate directive radiators, means for sequentially energizing said radiators with spaced impulses of radiant energy whereby a plurality of overlapping guide rays are produced, a receiver for said impulses, a plurality of indicating instruments equal in number to the number of said directive radiators and means for sequentially switching said receiver to each of said indicating instruments in synchronism with the energization of said radiators.

5. A system of guiding vehicles by radiant energy which comprises a transmitter, a plurality of separate directive radiators, means for sequentially energizing said radiators from said transmitter with spaced impulses of radiant energy whereby a plurality of overlapping guide rays are produced, a receiver for said impulses, a plurality of indicating instruments equal in number to the number of said directive radiators and means for sequentially switching said receiver to each of said indicating instruments in synchronism with the energization of said radiators, said means for sequentially energizing said radiators comprising a contact connected to each radiator, a plurality of contact arms connected to said transmitter and so operating between said contacts that only one of said contacts is engaged by a contact arm at any instant, said arms each having a length equal to one-half the length of the operating wave whereby the arms which are not in engagement with a contact present no load on said transmitter.

6. A system of guiding vehicles by radiant energy which comprises a transmitter, a plurality of separate directive radiators, means for sequentially energizing said radiators from said transmitter with spaced impulses of radiant energy whereby a plurality of overlapping guide rays are produced, a receiver for said impulses, a plurality of indicating instruments equal in number to the number of said directive radiators and means for sequentially switching said receiver to each of said indicating instruments in synchronism with the energization of said radiators, said means for sequentially energizing said radiators comprising a contact connected to each radiator, a plurality of contact arms connected to said transmitter, motor driven cam means for operating said arms between said contacts so that only one of said contacts is engaged by a contact arm at any instant, said arms each having a length equal to one half the length of the operating wave whereby the arms which are not in engagement with a contact present no load on said transmitter.

7. A system of guiding vehicles by radiant energy which comprises a transmitter, a plurality of separate directive radiators, means for sequentially energizing said radiators from said transmitter with spaced impulses of radiant energy whereby a plurality of overlapping guide rays are produced, all of said impulses being modulated with the same frequency, a receiver for said impulses, said receiver containing means for demodulating said impulses, and means for giving separate but closely adjacent continuously visible indications of the relative amplitude of the modulation on said impulses received by said receiver.

8. A system of guiding vehicles by radiant energy which comprises a transmitter, a plurality of separate directive radiators, means for sequentially energizing said radiators from said transmitter with spaced impulses of radiant energy whereby a plurality of overlapping guide rays are produced, a receiver for said impulses and means for giving separate but closely adjacent visible indication of the relative amplitude of said impulses received by said receiver, said means comprising a glow tube energized by said receiver and a mirror wheel rotated in synchronism with the energization of said radiators.

9. A system of guiding vehicles by radiant energy which comprises a transmitter, a plurality of separate directive radiators, means for sequentially energizing said radiators from said transmitter with spaced impulses of radiant energy whereby a plurality of overlapping guide rays are produced, a receiver for said impulses and means for giving separate but closely adjacent visible indication of the relative amplitude of said impulses received by said receiver, said means comprising a glow tube energized by said receiver, a mirror wheel rotated in synchronism with the energization of said radiators and a translucent screen scanned by said mirror wheel upon which luminous indications of the relative amplitude of said impulses are received.

10. A system as defined in claim 9 in which said glow tube is coated with a phosphorescent material whereby rapid variations in the amplitude of said impulses are marked out.

11. A system of guiding vehicles by radiant energy which comprises a transmitting station having a plurality of separate directive radiators, means for sequentially energizing said radiators with spaced impulses of radiant energy whereby a plurality of overlapping guide rays are produced, a receiver for said impulses, a plurality of indicating instruments equal in number to the number of said directive radiators, means for sequentially switching said receiver to each of said indicating instruments in synchronism with the energization of said radiators, and means for maintaining the synchronism comprising means for radiating a separate non-directive synchronizing impulse between a pair of said spaced impulses, and means for applying said synchronizing impulse to a motor for operating said switching means.

12. A system of guiding vehicles by radiant energy which comprises a transmitting station having a plurality of separate directive radiators, means for sequentially energizing said radiators with spaced impulses of radiant energy whereby a plurality of overlapping guide rays are produced, a receiver for said impulses, a plurality of indicating instruments equal in number to the number of said directive radiators and means for sequentially switching said receiver to each of said indicating instruments in synchronism with the energization of said radiators, and means for maintaining the synchronism comprising means for radiating a separate non-directive synchronizing impulse between a pair of said spaced impulses, means for applying said synchronizing impulse to a motor for operating said switching means, a separate indicating instrument also responsive to said synchronizing impulse and means responsive to an absence of said synchronizing impulse for disabling said plurality of indicating instruments.

13. In a radiant energy system wherein a high frequency source is selectively connected to a plurality of utilization means, a switch having fixed contacts connected to said means and a movable switch arm selectively engageable with said fixed contacts and having a position in which said arm is not in engagement with any of said contacts, said movable switch arm being connected to said source, said arm having a length equal to an integral multiple of a half the length of the operating wave whereby said arm presents no load to said source when it is not in engagement with said fixed contacts.

WALDEMAR ILBERG.
KARL RÖHRICH.